May 24, 1932. D. JONES 1,860,148
MEANS FOR EFFECTING A REVERSE MOVEMENT OF A CLUTCH CONTROLLED SHAFT
Filed Nov. 14, 1929
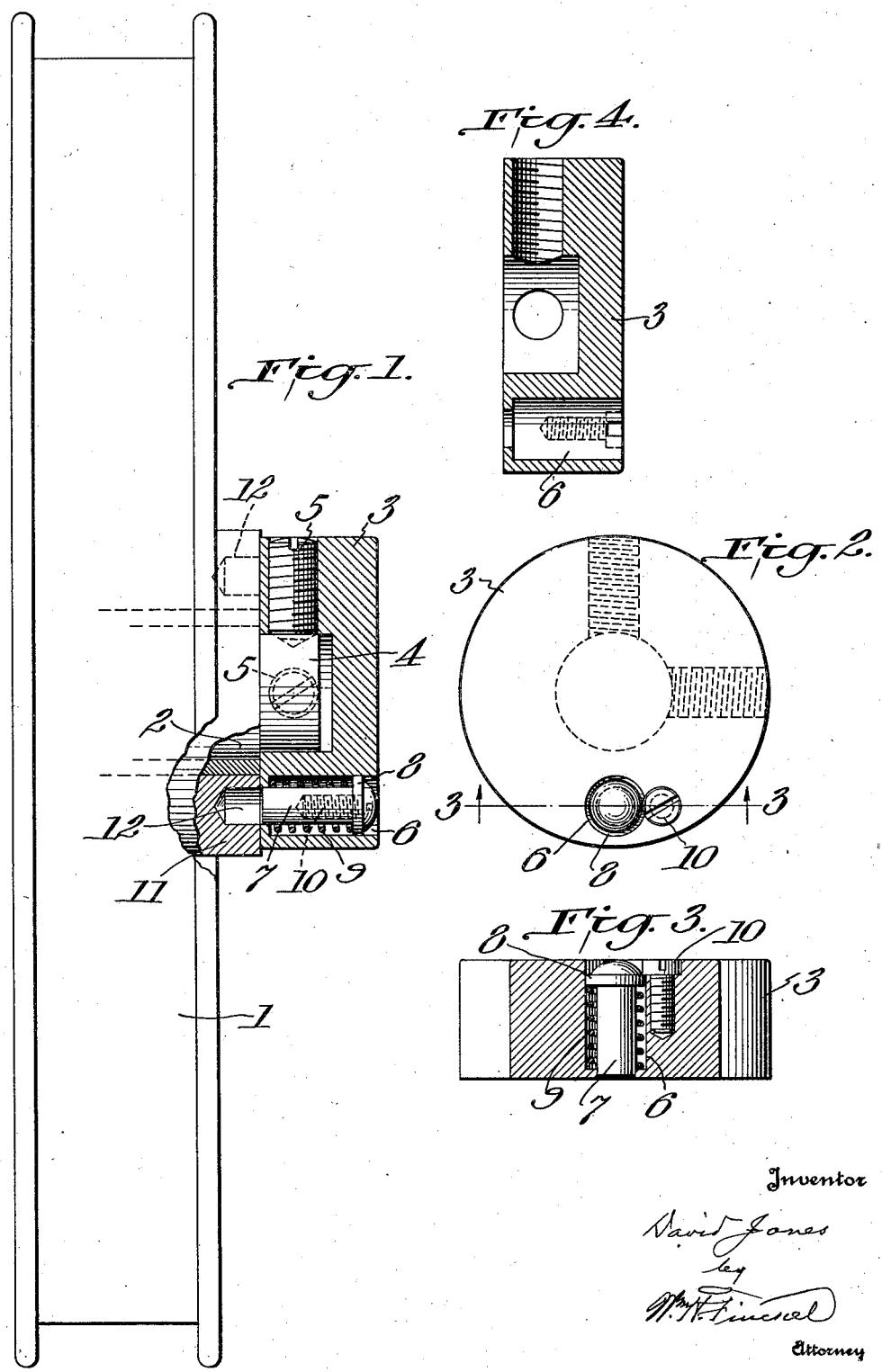

Patented May 24, 1932

1,860,148

UNITED STATES PATENT OFFICE

DAVID JONES, OF WATERBURY, CONNECTICUT, ASSIGNOR TO SCOVILL MANUFACTURING COMPANY, OF WATERBURY, CONNECTICUT, A CORPORATION OF CONNECTICUT

MEANS FOR EFFECTING A REVERSE MOVEMENT OF A CLUTCH-CONTROLLED SHAFT

Application filed November 14, 1929. Serial No. 407,301.

A primary object of this invention is to provide a reversing movement for automatic machines for attaching buttons or fasteners, so that should the machine jam in operation its motion may be reversed in order to clear out the jamming elements, without disturbing the adjustment of the machine.

In a well known machine of this character, a clutch of the roller type, is used, but it is only in engagement when the drive wheel is driven in one direction, and if the wheel is reversed it merely idles on the shaft, and there is therefore no letting up on the pinch to remove the jammed parts without disturbing the adjustment of the machine.

In the present invention an auxiliary clutching device is applied whereby upon a desired reversal of the direction of movement the drive pulley or fly-wheel may be made to turn with the shaft sufficiently to raise the plunger and thus relieve the jam sufficiently to remove the damaged parts.

The invention consists of a collar fixedly mounted to turn with the shaft and having a spring-withheld pin which may be engaged with an unclutched drive pulley, fly-wheel or other motion-imparting element when and as desired to permit the turning back or reversal of parts sufficient to admit of clearing a jam, as I will proceed now to explain and finally claim.

In the accompanying drawings illustrating the invention, in the several figures of which like parts are similarly designated, Figure 1 is an edge view of a drive pulley mounted on the shaft with the reversing collar of this invention shown in section. Fig. 2 is a front elevation of the reversing collar; Fig. 3 is a section on line 3—3 of Fig. 2, and Fig. 4 is a section similar to Fig. 1 of the collar, but with the spring pin and set screws omitted.

1 may represent a drive pulley loosely mounted on the shaft 2 in any usual or approved manner. This drive pulley may be clutched to turn with the shaft, and in the machine above referred to is used a clutch of the roller type.

As already pointed out, in some classes of machines, especially automatic machines, there is a possibility of jamming, and in order to provide for the ready relief of such jamming when it occurs, it is necessary to reverse the drive shaft sufficiently to permit an operative part, such as a plunger, to be lifted in order to gain access to the jammed parts without disturbing the adjustment of the machine. For this purpose I provide a collar 3 which may be applied to the end 4 of the drive shaft by means of one or more transverse set screws 5. The collar is provided with an opening 6 in which is mounted a pin 7 having a flanged head 8. This pin is normally pressed outward by a coiled spring 9 abutting against the partly-closed bottom of the hole 6 at one end and against the flanged head of the pin at the other end. Any suitable device may be used to prevent the escape of the spring pin from the collar, and I have shown one such means particularly in Figs. 2 and 3, same being a cap screw 10 set in the material of the collar with its head in a countersink opening into the opening 6 so that the head of the screw will overlap the flange of the head of the pin.

In the hub 11 of the drive pulley 1 are one or more sockets 12 adapted to be brought into alignment with the pin 7.

As already stated, the pin is normally spring-projected outwardly so as to free the pin from engagement with the sockets 12, but when occasion arrives for the reversal of the shaft or pulley, the pulley is unclutched and then it is turned back until the pin 7 is opposite one of the sockets 12, and then by means of his finger the operator pushes in the pin 7 against tension of the spring 9, when, by movement the pin is frictionally engaged with the socket in the hub of the pulley and reverse movement by hand is possible.

After the jammed parts have been cleared away, the frictional engagement of the pin with the hub may be released by a slight shaking of the pulley and the action of the spring 9.

The spring holds the pin within the collar in disengaged position until it is time to reverse the direction of the drive shaft itself, and then only is the spring pin positively pushed into engagement with any one of the sockets in the hub of the part 1, which may be a drive pulley, drive wheel or fly-wheel, and the resulting friction or pinch on this pin holds it in sufficiently to back off the pressure enough to remove the jam. Just as soon as the pinch is taken off the part 1, the spring pulls the pin out of engagement again and the drive in the forward direction may be resumed.

The part 1 may be, as shown, a drive pulley, but as already stated, it may be a drive wheel or fly-wheel or any other moving part of a machine, and accordingly by the term "drive wheel" mentioned in the claims, I do not mean to be limited to that one particular power element.

Variations in the details of construction are permissible within the principle of the invention and the claims following.

The invention, as clearly indicated in the foregoing and in the claims, is not limited to its use on automatic button and fastener attaching machines.

What I claim is:—

1. Means for effecting a reverse movement of a clutch-controlled shaft having a drive wheel, same consisting of a collar fixedly applied to the end of the drive shaft, said collar having an opening partly closed at its inner end, a headed pin mounted in said opening in alignment with the hole in the partly closed portion, a spring arranged in said opening between the head of the pin and the partly closed bottom and adapted to normally project said pin outwardly, and a pin retaining device countersunk in the collar parallel with the pin and projecting into the path of outward movement of the pin.

2. Means for effecting a reverse movement of a clutch-controlled drive shaft normally turning in one direction and having a drive wheel provided with a hub and sockets therein, a collar fixedly applied to the end of the drive shaft next to said hub and having a normally retracted spring pin adapted to be positively thrown into engagement with any one of the sockets in the hub of the drive wheel and frictionally held in such engagement for any desired period to permit the reversal of movement of the drive shaft to clear a jam of work in the machine and then automatically disengaged to permit the normal movement of the machine.

In testimony whereof I have hereunto set my hand this 12th day of November, A. D. 1929.

DAVID JONES.